Nov. 8, 1932.　　　　J. WILCZYNSKI　　　　1,887,144
REAR VIEW MIRROR FOR AUTOMOBILES
Filed Oct. 6, 1931
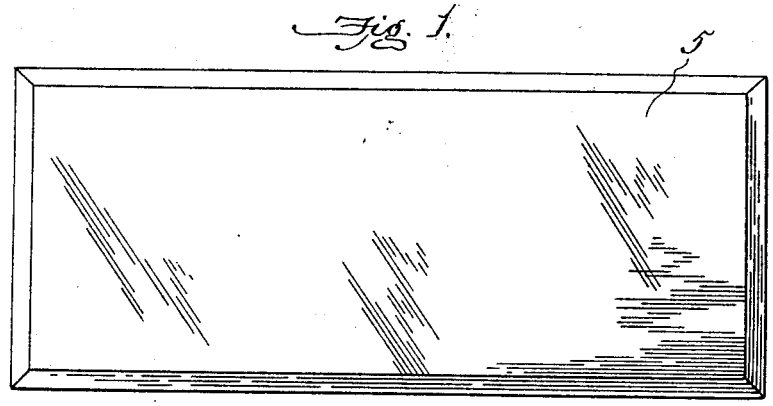
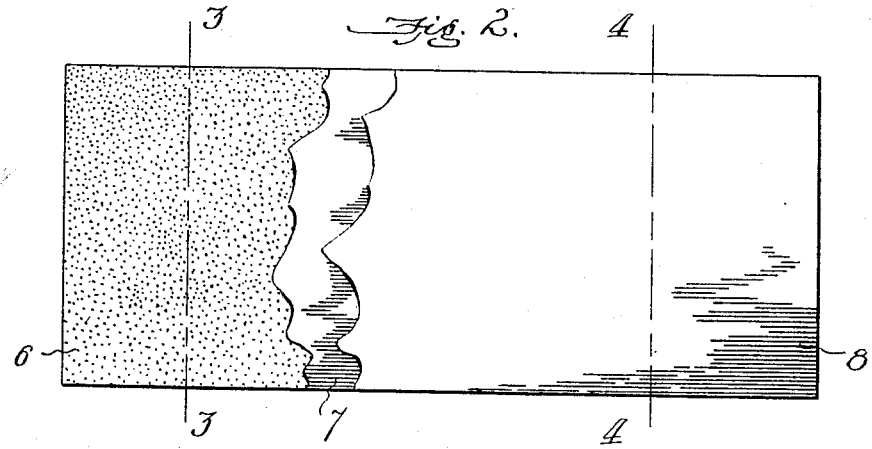
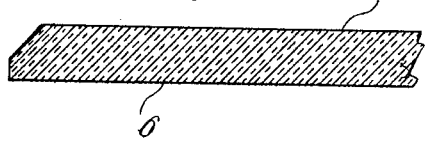
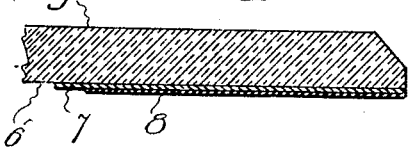
Inventor:
John Wilczynski.

Patented Nov. 8, 1932

1,887,144

UNITED STATES PATENT OFFICE

JOHN WILCZYNSKI, OF BUFFALO, NEW YORK

REAR VIEW MIRROR FOR AUTOMOBILES

Application filed October 6, 1931. Serial No. 567,258.

My invention is an improvement in mirrors designed especially for use as a rear view mirror for automobiles supported by a bracket such as illustrated and described in my prior application for patent filed March 28, 1928, Serial No. 265,382, of which this application is a continuation-in-part.

The principal object of my invention is to provide a rear view mirror for automobiles which will be effective in absorbing intense light—such as the glare from headlights of another automobile reflected in the mirror—without impairing the effectiveness of the mirror in giving a clear reflection of objects beyond the range of the subdued light of headlights, and the driver's eyes being thus unaffected by any glaring light from the mirror he is not prevented from giving his attention to objects in front of the automobile he is driving.

With this principal object in view my invention contemplates the provision of a mirror for the special purpose stated in which the back face of a colored plate of glass is roughened to neutralize its effect as a reflecting medium and then provided with a backing or coating preferably a silvered coating on the roughened surface and covered by a protective backing; all as hereinafter fully described and more specifically set forth in the appended claims.

In the accompanying drawing:

Figure 1 is an elevation of a mirror of a conventional shape usuable as a rear view mirror for automobiles.

Fig. 2 is a rear view of the mirror with part of the coatings for the back broken away, and Figs. 3 and 4 are enlarged sectional views of fragments of the mirror on the lines 3—3 and 4—4 of Fig. 2.

In carrying out my invention I employ a glass plate 5 of a dark color, preferably blue, and roughen the rear surface 6 by grinding with emery so as to neutralize its effect in reflecting intense light, the ground surface being then given a silvered coating 7 protected by a coating of paint or other substance 8.

It will be understood that instead of the glass plate being dark blue it may be of any other desirable color, as for instance amber, green, chartreuse, etc., and that the rear surface being ground flat serves to neutralize or deaden the reflection so that instead of a glaring light being reflected into the driver's eyes from the headlights of an automobile in the rear of the one he is driving the approaching headlights will be dimmed or reflect subdued lights that will not interfere with his giving attention to objects in front of the automobile he is driving, while the silvered coating acts to clearly define those objects reflected in the field of the mirror beyond the subdued lights reflected from the headlights.

In the use of a mirror embodying my improved method of construction supported in the automobile as by the bracket shown and described in my application for patent hereinbefore referred to the driver will not be annoyed by the glare of headlights of automobiles approaching from the rear and the intense light or glare being eliminated the said mirror will reflect other objects with sufficient clearness to enable him to see conditions in the rear of his automobile as well as in the front.

My improved mirror may be used for any other purpose for which it may be found advantageous or desirable, and from the foregoing description it will be obvious that the essential feature is the roughening of the rear flat surface of a colored glass plate so as to neutralize reflection from the mirror, the said surface being roughened by grinding with emery, by means of a sand blast, or in any other manner, and likewise any suitable backing applied as a cooperating medium within the spirit and scope of the appended claims.

I claim:—

1. A mirror for subduing the reflection of intense light comprising a colored glass plate having a roughened rear surface, and a reflective coating applied to said roughened surface.

2. A mirror for subduing the reflection of intense light comprising a colored glass plate having a roughened rear surface, and a silvered coating applied to said roughened surface.

3. A mirror for subduing the reflection of intense light comprising a colored glass plate having the rear surface roughened by grinding with emery, a silvered coating applied to said roughened surface, and a protective backing covering the silvered coating.

JOHN WILCZYNSKI.